United States Patent
Kumar et al.

(10) Patent No.: US 12,149,332 B2
(45) Date of Patent: Nov. 19, 2024

(54) MOBILE COMMUNICATION SYSTEM EMPLOYING ACTIVE BANDWIDTH MANAGEMENT

(71) Applicant: The Boeing Company, Chicago, IL (US)

(72) Inventors: Anil Kumar, Sammamish, WA (US); David Phillips, Seattle, WA (US); Michael G. Reinbold, Everett, WA (US)

(73) Assignee: The Boeing Company, Chicago, IL (US)

( * ) Notice: Subject to any disclaimer, the term of this patent is extended or adjusted under 35 U.S.C. 154(b) by 391 days.

(21) Appl. No.: 17/527,345

(22) Filed: Nov. 16, 2021

(65) Prior Publication Data

US 2022/0158724 A1    May 19, 2022

Related U.S. Application Data

(60) Provisional application No. 63/114,841, filed on Nov. 17, 2020.

(51) Int. Cl.
*H04B 7/185* (2006.01)
*H04W 28/06* (2009.01)
*H04W 28/20* (2009.01)

(52) U.S. Cl.
CPC ........ *H04B 7/18543* (2013.01); *H04W 28/06* (2013.01); *H04W 28/20* (2013.01)

(58) Field of Classification Search
CPC .............. H04B 7/18543; H04B 7/1851; H04B 7/18506; H04B 7/18513; H04B 7/18519; H04W 28/06; H04W 28/20
See application file for complete search history.

(56) References Cited

U.S. PATENT DOCUMENTS 6,078,958 A * 6/2000 Echeita ............ H04N 21/23611
                                                          709/234
11,038,585 B1 * 6/2021 Chowdhury ....... H04B 7/18513
(Continued)

FOREIGN PATENT DOCUMENTS

EP              1320948 B1 *  2/2007    ......... H04B 7/18506

OTHER PUBLICATIONS

European Patent Office. Extended European Search Report for EP Application No. 21205030.6, mailed Apr. 4, 2022, pp. 1-6.
(Continued)

*Primary Examiner* — Ayaz R Sheikh
*Assistant Examiner* — David Zhijun Sun
(74) *Attorney, Agent, or Firm* — Vivacqua Crane, PLLC

(57) ABSTRACT

A mobile communication system for sending data to one or more satellite resources over a wireless connection includes one or more processors and a memory coupled to the processors. The memory stores data into a database and program code that, when executed by the processors, causes the mobile communication system to receive a primary service data stream and a secondary service data stream, and determine a bandwidth utilization efficiency of the wireless connection between the mobile communication system and the one or more satellite resources. In response to determining the wireless connection has available headroom, the primary service data stream is combined with the secondary service data stream to create an aggregated data packet. In response to determining the aggregated data packet is less than or equal to the size of the available headroom, the mobile communication system transmits the aggregated data packet over the wireless connection.

20 Claims, 10 Drawing Sheets

(56) References Cited

U.S. PATENT DOCUMENTS

| | | |
|---|---|---|
| 2007/0026795 A1 | 2/2007 | De La Chapelle |
| 2013/0064229 A1 | 3/2013 | Gidlund et al. |
| 2016/0119052 A1* | 4/2016 | Frerking ............... H04W 24/02 |
| | | 455/431 |
| 2020/0244345 A1* | 7/2020 | Goettle .............. H04B 7/18515 |

OTHER PUBLICATIONS

Canadian Intellectual Property Office. First Office Action for CA Application No. 3,131,473, mailed Feb. 5, 2024, pp. 1-5.

* cited by examiner

MOBILE COMMUNICATION SYSTEM EMPLOYING ACTIVE BANDWIDTH MANAGEMENT

CROSS-REFERENCE TO RELATED APPLICATION

This application claims priority to U.S. Provisional Application No. 63/114,841, filed Nov. 17, 2020. The contents of the application are incorporated herein by reference in its entirety.

INTRODUCTION

The present disclosure relates to a mobile communication system. More specifically, the present disclosure relates to a mobile communication system that employs active bandwidth management when sending two or more service data streams to one or more satellite resources over a wireless communication network.

BACKGROUND

All digital communication systems such as, for example, cellular and satellite communication systems include several basic components. Specifically, digital communications systems include a data source and/or data destination, a modulator and/or demodulator, a radio frequency (RF) up/down converter, and an antenna with an associated antenna controller. The differences in the specific components of digital communication systems are based on the type of modulation that is employed by a particular communication system as well as the channel access mechanism used in a multi-user environment. The specific type of antenna that is employed by a digital communication system also depends on the particular application as well. For example, satellite communication systems typically employ highly directional antennas that focus RF energy in a particular direction. In contrast, omni-directional antennas focus RF energy in all directions and may be used in applications such as, but not limited to, cellular networks.

In one example, a broadband satellite communication system includes a ground earth station, a satellite, and a remote terminal that is installed physically on an aircraft. The remote terminal installed on the aircraft employs a satellite modem and manager, which is referred to as a ModMan. However, the ModMan is customized to host a specific modem card. In other words, the ModMan is only capable of supporting a single specific antenna and bandwidth, which is extremely limiting and may create issues. For example, once the remote terminal is installed on an aircraft, if the airline eventually decides to change the specific bandwidth or antenna, then it will be necessary to replace the remote terminal. Furthermore, a replacement terminal requires re-certification as well.

SUMMARY

According to several aspects, a mobile communication system for sending data to one or more satellite resources over a wireless connection is disclosed. The mobile communication system includes one or more processors and a memory coupled to the one or more processors. The memory stores data into a database and program code that, when executed by the one or more processors, causes the mobile communication system to receive a primary service data stream from one or more primary data sources and a secondary service data stream from one or more secondary data sources. The mobile communication system determines a bandwidth utilization efficiency of the wireless connection between the mobile communication system and the one or more satellite resources. The mobile communication also determines the wireless connection has available headroom based on the bandwidth utilization efficiency of the one or more satellite resources. In response to determining the wireless connection has available headroom, the mobile communication system combines the primary service data stream with the secondary service data stream to create an aggregated data packet. The mobile communication system compares a size of the aggregated data packet with a size of the available headroom of the wireless connection between the mobile communication system and the one or more satellite resources. The mobile communication system determines the size of the aggregated data packet is less than or equal to the size of the available headroom. In response to determining the aggregated data packet is less than or equal to the size of the available headroom, the aggregated data packet is transmitted over the wireless connection.

In another aspect, an aircraft is disclosed. The aircraft includes a mobile communication system configured to send data to one or more satellite resources over a wireless connection. The mobile communication system includes one or more antennas and two or more modems in electronic communication with the one or more antennas. The mobile communication system also includes one or more processors in electronic communication with the one or more antennas and the two or more modems as well as a memory coupled to the one or more processors. The memory stores data into a database and program code that, when executed by the one or more processors, causes the mobile communication system to receive a primary service data stream from one or more primary data sources and a secondary service data stream from one or more secondary data sources. The mobile communication system determines a bandwidth utilization efficiency of the wireless connection between the mobile communication system and the one or more satellite resources. The mobile communication also determines the wireless connection has available headroom based on the bandwidth utilization efficiency of the one or more satellite resources. In response to determining the wireless connection has available headroom, the mobile communication system combines the primary service data stream with the secondary service data stream to create an aggregated data packet. The mobile communication system compares a size of the aggregated data packet with a size of the available headroom of the wireless connection between the mobile communication system and the one or more satellite resources. The mobile communication system determines the size of the aggregated data packet is less than or equal to the size of the available headroom. In response to determining the aggregated data packet is less than or equal to the size of the available headroom, the aggregated data packet is transmitted over the wireless connection.

In yet another aspect, a method of for sending data to one or more satellite resources over a wireless connection by a mobile communication system is disclosed. The method includes receiving, by a computer, a primary service data stream from one or more primary data sources and a secondary service data stream from one or more secondary data sources. The method also includes determining, by the computer, a bandwidth utilization efficiency of a wireless connection between the mobile communication system and the one or more satellite resources. The method further includes determining, by the computer, the wireless connection has available headroom based on the bandwidth utilization efficiency of the one or more satellite resources. In response to determining the wireless connection has available headroom, the method includes combining the primary service data stream with the secondary service data stream to create an aggregated data packet. The method also includes comparing a size of the aggregated data packet with a size of the available headroom of the wireless connection between the mobile communication system and the one or more satellite resources. The method also includes determining the size of the aggregated data packet is less than or equal to the size of the available headroom. Finally, in response to determining the aggregated data packet is less than or equal to the size of the available headroom, the method includes transmitting the aggregated data packet over the wireless connection.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a mobile communication system that employs active bandwidth management when sending two or more service data streams to one or more satellite resources over a wireless communication network. Specifically, the disclosed mobile communication system includes a modem manager that receives a primary service data stream from a primary data source as well as a secondary service data stream from a secondary data source, where the primary service data stream takes precedence over the secondary service data stream. In at least some instances, the primary service data stream may have limited bandwidth needs. As a result, a considerable amount of available headroom in a wireless connection between the satellites and the mobile communication system may become available. The disclosed mobile communication system determines if there is unused or available headroom in the wireless connection between the satellites and the mobile communication system. Specifically, the modem manager determines whether there is enough available headroom in the wireless connection to support an aggregated data packet that includes both the primary service data stream and the secondary service data stream. If available headroom exists, then the aggregated data packet is transmitted over the wireless communication network to the satellites. Accordingly, the modem manager supports two or more service data streams without introducing additional elements or cost.

The following description is merely exemplary in nature and is not intended to limit the present disclosure, application, or uses.

Figure 1:
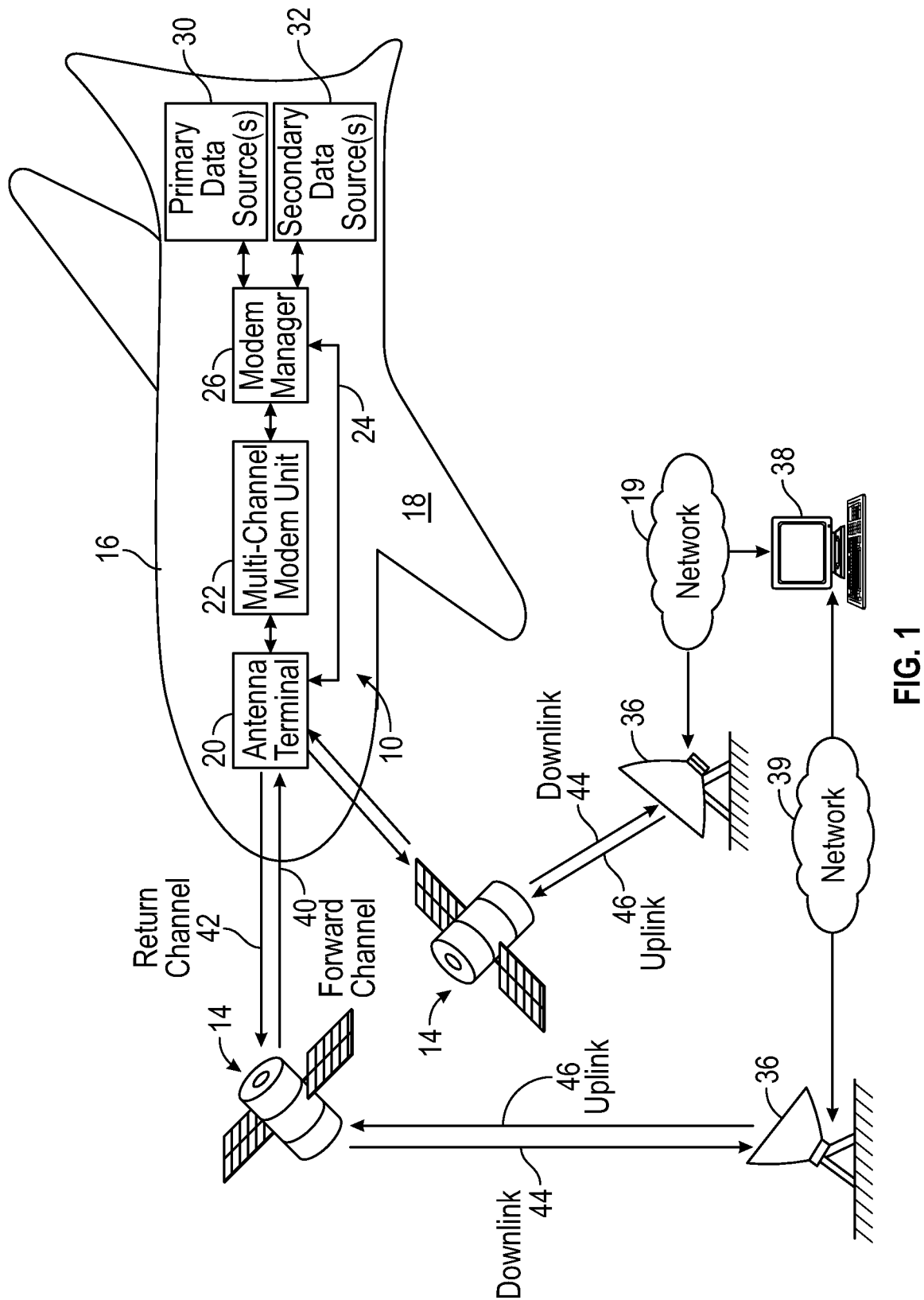
FIG. 1 is a schematic diagram of the disclosed mobile communication system installed on an aircraft, where the mobile communication system is in wireless communication with one or more satellite resources, according to an exemplary embodiment.

Referring to FIG. 1, a mobile communication system 10 for sending data over a wireless communication network to one or more satellite resources 14 is illustrated. The mobile communication system 10 is located upon a mobile platform 16. In the non-limiting embodiment as shown in FIG. 1, the mobile platform 16 is an aircraft 18, however, it is to be appreciated that the mobile platform 16 is any airborne, land-based, or sea-based platform that changes location. For example, in another embodiment, the mobile platform 16 is a marine vessel, a train, an automobile, or an unmanned or autonomous aircraft. The one or more satellite resources 14 may be any type of satellite for receiving data from the mobile platform 16 such as, for example, a low-earth orbit (LEO) or geosynchronous equatorial orbit (GEO) satellites. It is to be appreciated that the mobile communication system 10 sends data to the two or more satellite resources 14. However, since the mobile platform 16 changes location over time, the specific satellite resources 14 that the mobile communication system 10 sends data to may change over time. The mobile communication system 10 sends two or more types of service data streams to the one or more satellite resources 14, where each service data stream corresponds to a unique communication profile. As explained below, the disclosed mobile communication system 10 employs active bandwidth management for supporting the two or more service data streams.

In one embodiment, the two or more service data streams include a primary service data stream and a secondary service data stream, where the primary service data stream takes precedence over the secondary data stream. For example, in one embodiment, the primary service data stream includes either aircraft information traffic or aircraft control traffic, while the secondary data stream includes entertainment traffic. However, it is to be appreciated that this embodiment is merely exemplary in nature, and other or additional types of service data may be included as well. Indeed, although the disclosure describes only a primary service data stream and a secondary service data stream, it is to be appreciated that only two data streams are mentioned for purposes of simplicity and clarity, and the mobile communication system 10 may also manage more than two data services as well.

Continuing to refer to FIG. 1, the mobile communication system 10 includes an antenna terminal 20, a multi-channel modem unit 22, and a modem manager 26. The modem manager 26 is in electronic communication with the modem unit 22 and the antenna terminal 20, and the modem unit 22 is in electronic communication with the antenna terminal 20. In one example, an optional wireless communication link 24 may be used to electronically connect the antenna terminal 20 with the modem manager 26. In one embodiment, the wireless communication link 24 operates at a relatively low frequency such as, for example, an L-band switch network ranging from about 1 to about 2 gigahertz. The modem manager 26 is in electronic communication with one or more primary data sources 30 and one or more secondary data sources 32. For example, in an embodiment the modem manager 26 is in electronic communication with the one or more primary data sources 30 and the one or more secondary data sources 32 over an ethernet connection. The modem manager 26 receives a primary service data stream from the one or more primary data sources 30 and a secondary service data stream from the one or more secondary data sources 32.

The one or more satellite resources 14 are also in wireless communication with the antenna terminal 20 of the mobile communication system 10 over a wireless communication network. The one or more satellite resources 14 are also in wireless communication with one or more ground earth stations 36 over a wireless communication network as well. The ground earth stations 36 are in electronic communication with a client 38 over a wireless communication network 39, where the wireless communication network 39 may be terrestrial internet. In an embodiment, data is sent from the one or more satellite resources 14 to the antenna terminal 20 of the mobile communication system 10 over a forward channel 40. Data from the sources 30, 32 of the mobile platform 16 is communicated to the modem manager 26, and the data is then sent to the one or more satellite resources 14 through a return channel 42. Data is sent from each satellite resource 14 to the corresponding ground earth station 36 by a downlink 44. Likewise, data is sent from a corresponding one of the ground earth stations 36 to one of the satellite resources 14 by an uplink 46.

Figure 2:
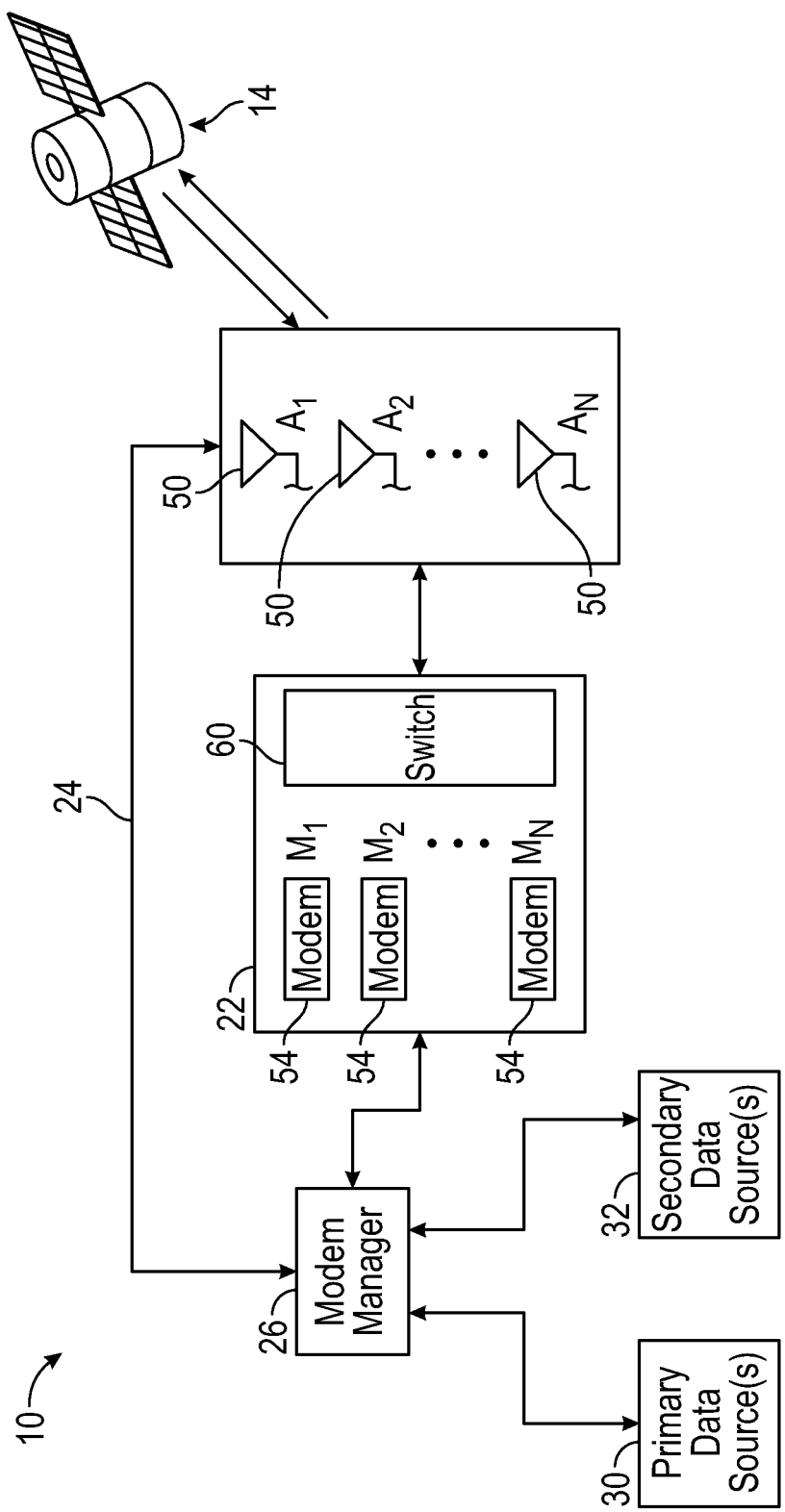
FIG. 2 is a schematic diagram of the mobile communication system shown in FIG. 1 including a modem manager, an antenna terminal, and a modem unit, according to an exemplary embodiment.

FIG. 2 is a schematic diagram of the mobile communication system 10 shown in FIG. 1. The antenna terminal 20 includes one or more antennas 50, where each antenna 50 includes both transmitting and receiving capabilities. For example, in the embodiment as shown in FIG. 2, there are N number of antennas 50, where N is any whole number. The one or more antennas 50 include single-beam antennas, dual-beam antennas, and multi-beam antennas. In one embodiment, the antenna terminal 20 includes as few as one single-beam antenna 50. Alternatively, in another embodiment, the antenna terminal 20 unit includes a plurality of multi-beam antennas. For example, in an embodiment, the antennas 50 are combined Ka/Ku antennas, with the ability to switch between frequency bands as required. The one or more antennas 50 are in wireless communication with the modem manager 26 over the wireless communication link 24.

The modem unit 22 includes two or more modems 54. For example, in the embodiment as shown in FIG. 2, there are N number of modems 54. The two or more modems 54 are in electronic communication with one or more antennas 50. Each modem 54 is configured to support one of the service data streams (i.e., the primary service data stream and the secondary service data stream). The modem unit 22 includes an antenna switch 60 configured to connect each modem 54 to one or more of the antennas 50.

The modem manager 26 is configured to manage the active bandwidth between the one or more satellite resources 14 and the mobile communication system 10. Specifically, the modem manager 26 is configured to continuously monitor the bandwidth utilization efficiency of the wireless communication between the one or more satellite resources 14 and the mobile communication system 10 (i.e., the return channel 42 seen in FIG. 1). The bandwidth capacity of wireless communication between the one or more satellite resources 14 and the mobile communication system 10 is configured to meet the service level agreement for the primary service data stream. However, it is to be appreciated that in at least some instances, the primary service data stream may have limited bandwidth needs. As a result, there may be a considerable amount of unused headroom in the wireless connection between the one or more satellite resources 14 and the mobile communication system 10.

The mobile communication system 10 takes advantage of the unused headroom by actively managing the bandwidth of the wireless connection between the mobile communication system 10 and the one or more satellite resources 14 (i.e., the return channel 42). Specifically, the modem manager 26 determines the bandwidth utilization efficiency of the wireless connection between the mobile communication system 10 and the one or more satellite resources 14, where the modem manager 26 determines if available headroom 66 exists based on the bandwidth utilization efficiency. In response to determining there is available headroom 66 in the wireless connection between the one or more satellite resources 14 and the mobile communication system 10, the modem manager 26 then determines whether there is enough available headroom 66 to support a data service stream that combines the primary service data stream and the secondary service data stream together. As explained in greater detail below, the modem manager 26 combines the primary service data stream and the secondary service data stream together to create an aggregated data packet 70 (seen in FIG. 3). If the aggregated data packet 70 fits within the available headroom 66, then the modem manager 26 transmits the aggregated data packet 70 over the wireless communication network to the one or more satellite resources 14. The modem manager 26 actively manages the bandwidth utilization efficiency of the wireless connections between the one or more satellite resources 14 and the mobile communication system 10, thereby supporting the requirements of two or more service data streams, and without introducing additional elements or cost. It is to be appreciated that although the return channel 42 between the one or more satellite resources 14 and the mobile communication system 10 is described, a similar approach to managing bandwidth may be applied to the uplink 46 between one of the satellite resources 14 and the ground station 36 as well.

Figure 3:
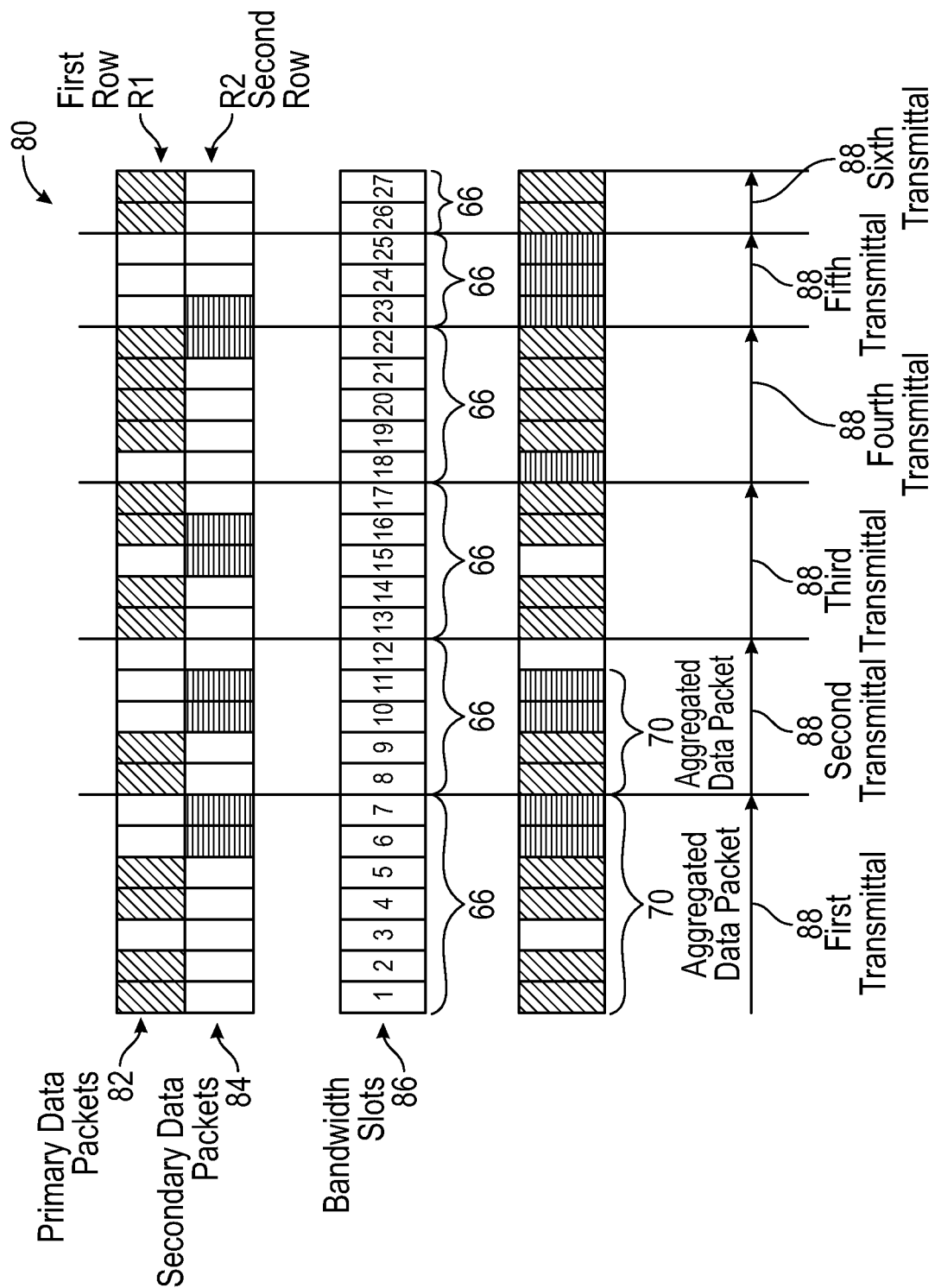
FIG. 3 is a diagram illustrating data packets for a primary service data stream and a secondary service data stream as well as corresponding bandwidth slots, according to an exemplary embodiment.

FIG. 3 is an exemplary diagram 80 illustrating how the aggregated data packet 70 is created. The diagram 80 illustrates a plurality of primary data packets 82 that are arranged in sequence with one another along a first row R1, where the plurality of primary data packets 82 are part of the primary service data stream. The primary data packets 82 each represent a contiguous group of bits, where each primary data packet 82 is assigned a bandwidth and a priority. The diagram 80 also includes a plurality of secondary data packets 84 that are arranged in sequence with one another along a second row R2, where the plurality of secondary data packets 84 are part of the secondary service data stream. The secondary data packets 84 also represent a contiguous group of bits, where each secondary data packet 84 is assigned a bandwidth and a priority. In the exemplary embodiment as shown in FIG. 3, there are sixteen primary data packets 82 and eight secondary data packets 84.

The diagram 80 also illustrates a plurality of bandwidth slots 86 that are arranged in sequence with one another, where each bandwidth slot 86 represents a unit of headroom in the return channel 42 (FIG. 1) for a specific unit of time. For example, the bandwidth slot 86 may be measured by frequency (e.g., megahertz) or by data transfer rate (e.g., megabytes per second). In the exemplary embodiment as shown in FIG. 3, twenty-seven bandwidth slots 86 are numbered in sequence (e.g., the slots are each numbered 1-27). The bandwidth slots 86 are divided into transmittals 88, where the transmittals 88 occur sequentially over the return channel 42. In the example as shown in FIG. 3, six transmittals 88 are shown. The first transmittal 88 includes seven bandwidth slots 86, the second transmittal 88 includes five bandwidth slots 86, the third transmittal 88 includes five bandwidth slots 86, the fourth transmittal 88 includes five bandwidth slots 86, the fifth transmittal 88 includes three bandwidth slots 86, and the sixth transmittal 88 includes two bandwidth slots 86.

As seen in FIG. 3, four primary data packets 82 and two secondary data packets 84 are part of the first transmittal 88. The primary data packets 82 and the secondary data packets 84 that are part of the first transmittal 88 are combined together to create a first aggregated data packet 70, where the primary data packets 82 take precedence over the secondary data packets 84. As seen in FIG. 3, the aggregated data packet 70 includes a size requiring six bandwidth slots 86. As also seen in FIG. 3, a size of the available headroom 66 is seven bandwidth slots 86. Accordingly, the modem manager 26 determines the size of the aggregated data packet 70 (e.g., six bandwidth slots 86) is less than the size of the available headroom 66 in the wireless connection between the one or more satellite resources 14 and the mobile communication system 10 (e.g., seven bandwidth slots 86). In response to determining the aggregated data packet 70 is less than or equal to the size of the available headroom 66, the modem manager 26 transmits the aggregated data packet 70 over the wireless communication network to the one or more satellite resources 14 (shown in FIG. 1).

Continuing to refer to FIGS. 1 and 3, the third transmittal 88 includes four primary data packets 82 and two secondary data packets 84. Therefore, the aggregated data packet 70 requires six bandwidth slots 86. However, in contrast to the first transmittal 88, the available headroom 66 includes only five bandwidth slots 86. Thus, the aggregated data packet 70 is greater than the size of the available headroom 66. Therefore, only the primary data packets 82 are sent during the third transmittal 88. In one embodiment, the remaining secondary data packets 84 that were not sent during the third transmittal 88 are transmitted during subsequent transmittals 88. For example, in the embodiment as seen in FIG. 3, one of the two remaining secondary data packets 84 are sent during the fourth transmittal, and the other remaining secondary data packet 84 is sent during the fifth transmittal 88. As explained below, other alternatives exist when transmitting the remaining secondary data packets 84.

Figure 4A:
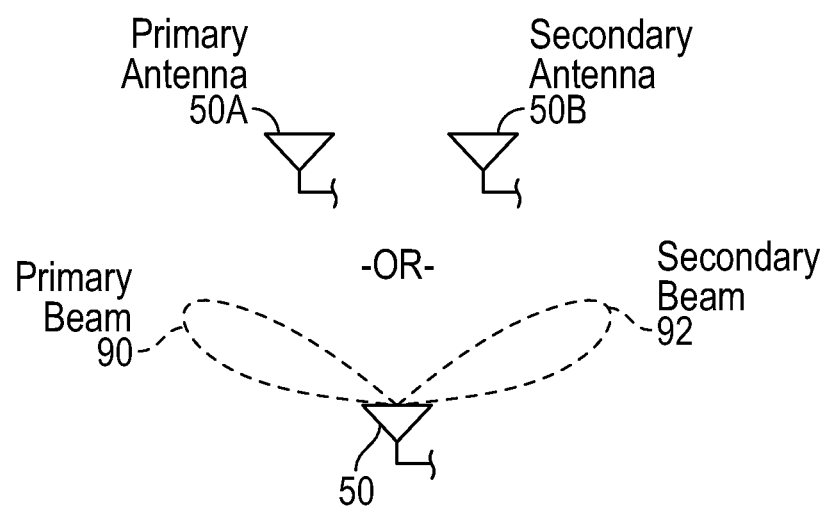
FIG. 4A illustrates a primary antenna and a secondary antenna as well as a multi-beam antenna transmitting a primary beam and the secondary beam, according to an exemplary embodiment.
Figure 4B:
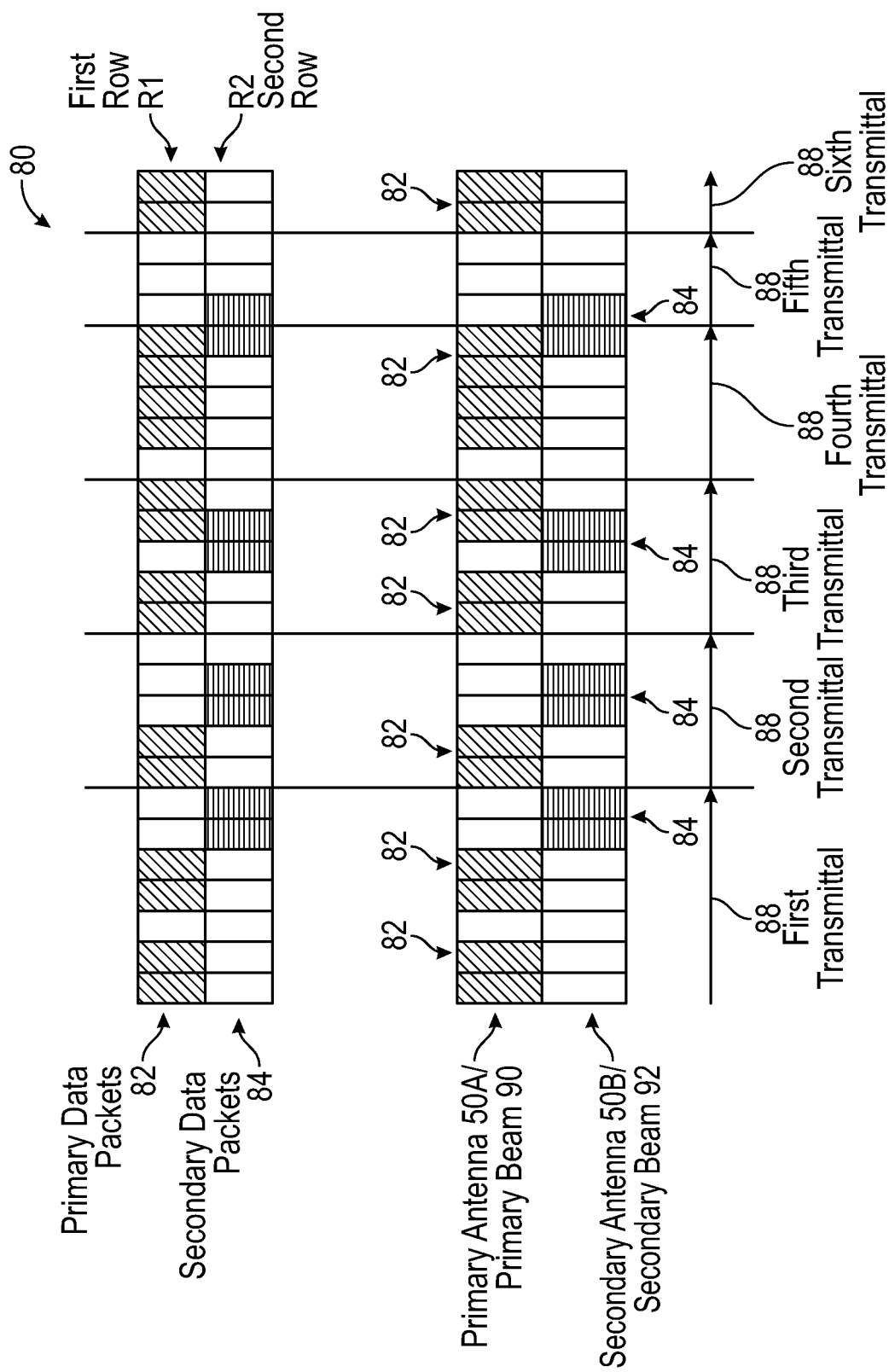
FIG. 4B illustrates an alternative approach for managing the available bandwidth shown in FIG. 3, according to an exemplary embodiment.

In one embodiment, there may be more than one antenna 50 available to transmit the primary service data stream and the secondary service data stream or, in the alternative, the available antenna 50 is a dual-beam antenna 50 having one or more available beams. For example, as seen in FIG. 4A, in one embodiment the mobile communication system 10 includes a primary antenna 50A and a secondary antenna 50B, where the primary antenna 50A and the secondary antenna 50B operate in single-beam mode. In one embodiment, the primary antenna 50A and the secondary antenna 50B include similar costs. In other words, the cost of transmitting data over the primary antenna 50A is about equal to the cost of transmitting data by the secondary antenna 50B. Referring now to FIG. 4B, the primary data packets 82 of the primary service data stream are transmitted by the primary antenna 50A, while the secondary data packets 84 that are part of the secondary service data stream are transmitted by the secondary antenna 50B.

Referring back to FIG. 4A, in another embodiment a multi-beam antenna 50 configured to transmit at least a primary beam 90 and a secondary beam 92 is provided. Similar to the primary antenna 50A and the secondary antenna 50B, if the cost of transmitting data over the primary beam 90 transmitted by the multi-beam antenna 50 is similar to the cost of transmitting data over the secondary beam 92 transmitted by the multi-beam antenna 50, then the primary data packets 82 of the primary service data stream are transmitted by the primary beam 90 while the secondary data packets 84 of the secondary service data stream are transmitted by the secondary beam 92, which is shown in FIG. 4B.

Figure 5:
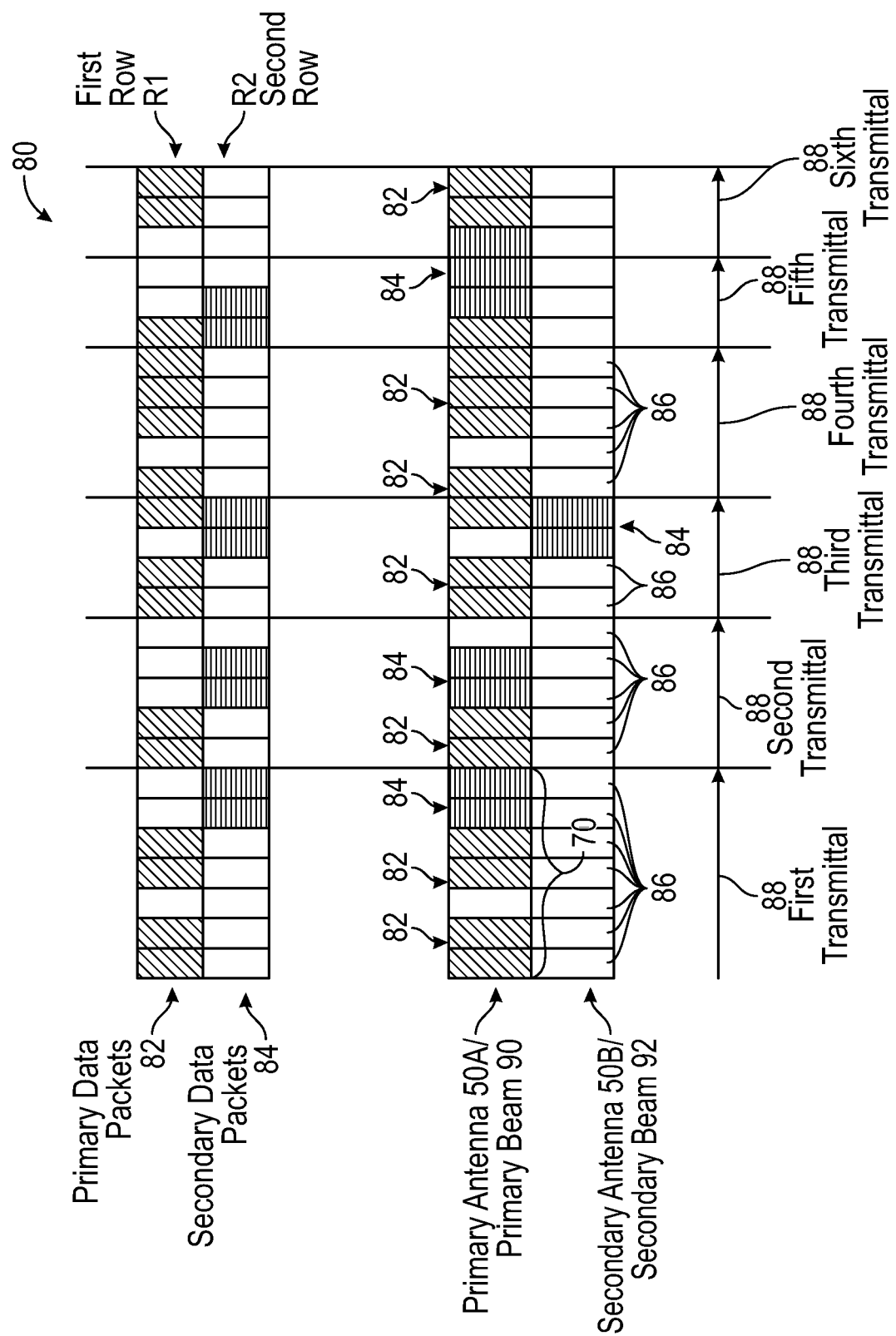
FIG. 5 illustrates yet another approach for managing the available bandwidth shown in FIG. 3, according to an exemplary embodiment.

In some instances, the cost of transmitting data over the primary antenna 50A is greater than the cost of transmitting data by the secondary antenna 50B. Accordingly, the modem manager 26 assigns the primary service data stream and the secondary data stream to the primary antenna 50A, but utilizes the secondary antenna 50B as a backup or alternative antenna for transmitting data when there is insufficient headroom available in the wireless connection between the primary antenna 50A and the one or more satellite resources 14. Similarly, the modem manager 26 also assigns the primary service data stream and the secondary data stream to the primary beam 90, but also utilizes the secondary beam 92 as an alternative beam for transmitting data when there is insufficient headroom available. Referring to FIGS. 1, 4A, and FIG. 5, the modem manager 26 (FIG. 1) transmits the aggregated data packet 70 over the primary antenna 50A when the aggregated data packet 70 is less than or equal to the size of the available headroom 66 (the available headroom 66 is shown in FIG. 3). However, as mentioned above, in contrast to the first transmittal 88, the third transmittal 88 includes only five bandwidth slots 86. Thus, the aggregated data packet 70 is greater than the size of the available headroom 66. Therefore, as seen in FIG. 5, the primary data packets 82 that are part of the third transmittal 88 are transmitted by the primary antenna 50A or the primary beam 90, however, the two remaining secondary data packets 84 are transmitted using the secondary antenna 50B or the secondary beam 92.

Figure 6A:
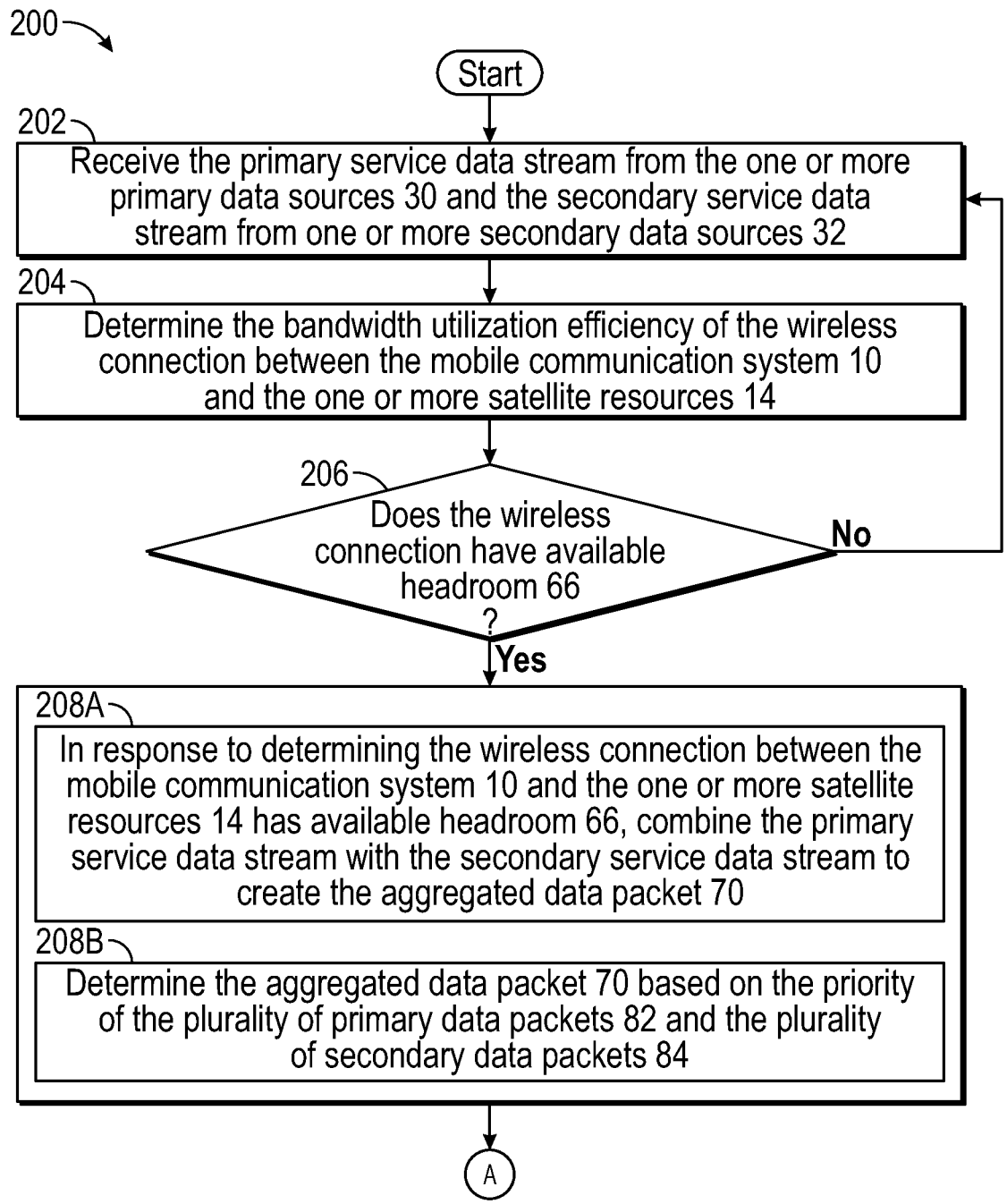
FIGS. 6A-6C illustrate an exemplary process flow diagram showing a method for sending data to the one or more satellite resources shown in FIG. 1 by the mobile communication system, according to an exemplary embodiment.
Figure 6B:
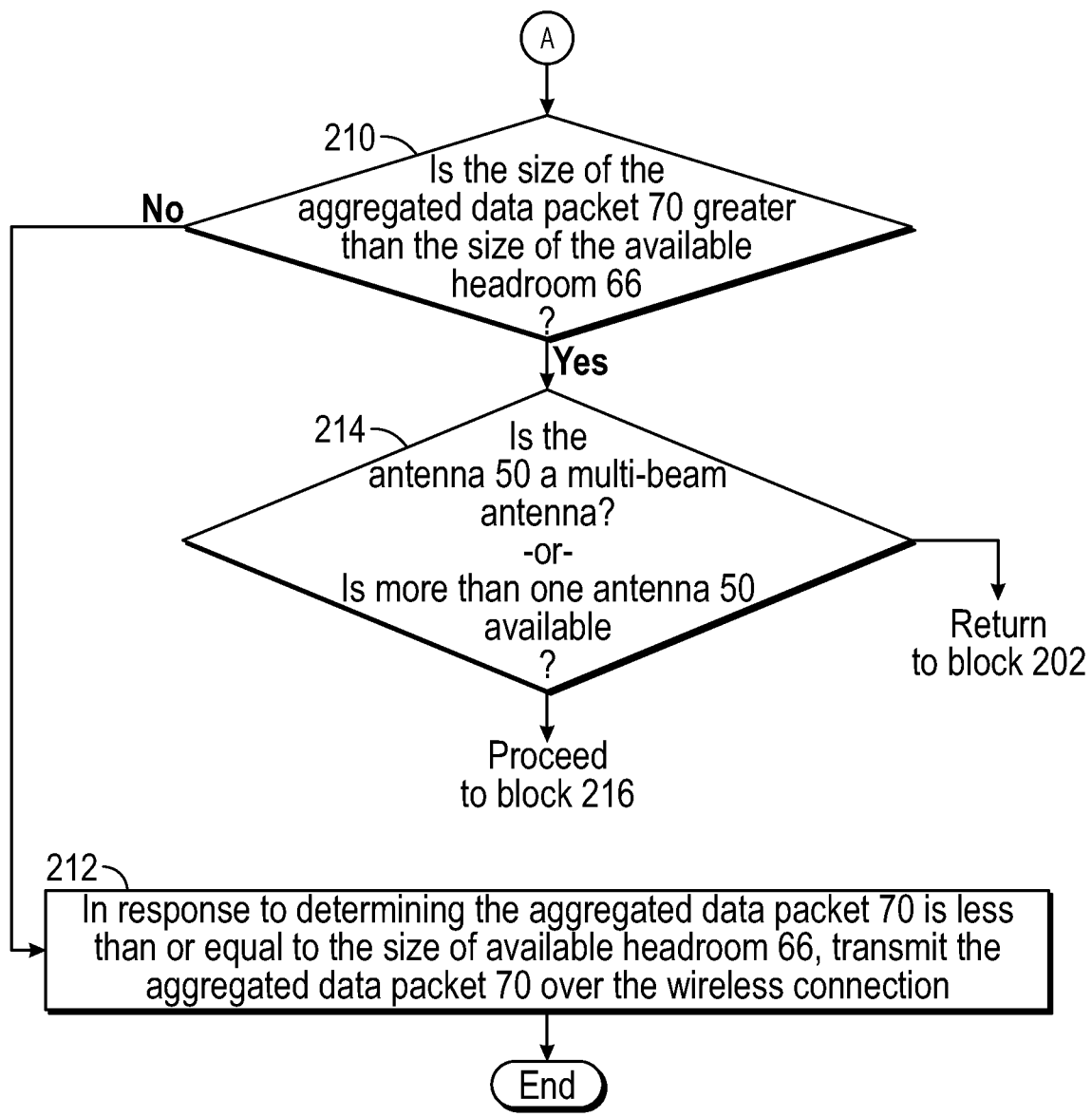
Figure 6C:
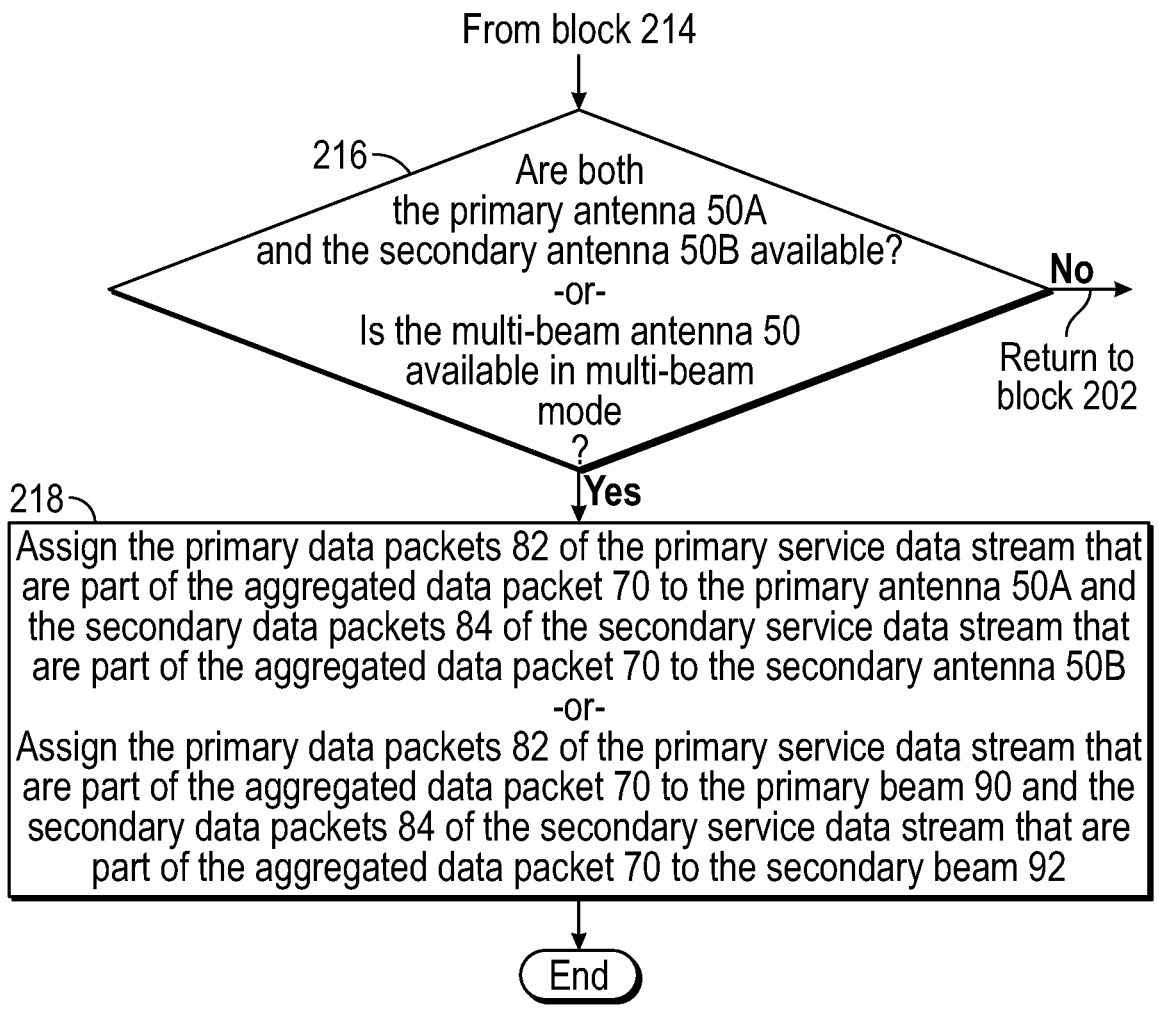

FIGS. 6A, 6B, and 6C illustrate an exemplary process flow diagram illustrating a method 200 for sending data to the one or more satellite resources 14 over the wireless communication network. Referring to FIGS. 1, 2, 3, and 6A, the method 200 may begin at block 202. In block 202, the modem manager 26 receives the primary service data stream from the one or more primary data sources 30 and the secondary service data stream from the one or more secondary data sources 32. The method 200 may then proceed to block 204.

In block 204, the modem manager 26 determines the bandwidth utilization efficiency of the wireless connection between the mobile communication system 10 and the one or more satellite resources 14. In an embodiment, the bandwidth utilization efficiency of the one or more satellite resources is determined based on Equation 1, which is:

$$\text{bandwidth utilization efficiency} = \frac{B}{P_B + S_B} \times 100 \quad \text{Equation 1}$$

where B represents a bandwidth of the one or more satellite resources 14, PB represents a bandwidth of the primary data packets 82, SB represents a bandwidth of the secondary data packets 84, and where the bandwidth utilization efficiency is measured as a percentage. The method 200 may then proceed to decision block 206.

In decision block 206, the modem manager 26 determines if the wireless connection between the one or more satellite resources 14 and the mobile communication system 10 has available headroom 66 (FIG. 3) based on the bandwidth utilization efficiency described in block 204. For example, in one embodiment if the bandwidth utilization efficiency is one hundred percent (100%), then the modem manager 26 determines available headroom 66 does not exist, and the method 200 returns to block 202. However, if the bandwidth utilization efficiency is less than one hundred percent (100%), then the modem manager 26 determines available headroom 66 exists, and the method 200 proceeds to block 208A.

In block 208A, in response to determining the wireless connection between the mobile communication system 10 and the one or more satellite resources 14 have available headroom 66, the modem manager 26 combines the primary service data stream with the secondary service data stream to create the aggregated data packet 70 shown in FIG. 3. Specifically, as seen in block 208B, the modem manager 26 determines the aggregated data packet 70 based on the priority of the one or more primary data packets 82 and the one or more secondary data packets 84, where the primary service data stream takes precedence over the secondary service data stream. The method 200 may then proceed to decision block 210.

Referring now to FIG. 6B, in decision block 210 the modem manager 26 compares the size of the aggregated data packet 70 with the size of the available headroom 66 of the wireless connection between the mobile communication system 10 and the one or more satellite resources 14. If the modem manager 26 determines the size of the aggregated data packet 70 is less than or equal to the size of the available headroom 66, then the method 200 proceeds to block 212.

In block 212, in response to determining the aggregated data packet 70 is less than or equal to the size of the available headroom 66, the modem manager 26 transmits the aggregated data packet 70 over the wireless connection. The method 200 may then terminate. However, if the modem manager 26 determines the size of the aggregated data packet 70 is greater than the size of the available headroom 66 of the wireless connection, then the method 200 proceeds to decision block 214.

In decision block 214, if the antenna 50 is a multi-beam antenna 50 or, alternatively, if more than one antenna 50 is available, then the method 200 proceeds the decision block 216. Otherwise, the method 200 returns back to block 202, and the modem manager 26 continues to receive the primary service data stream and the secondary service data stream.

Referring to FIG. 6C, in decision block 216 if the modem manager 26 determines the multi-beam antenna 50 is available in multi-beam mode or, alternatively, if the modem manager 26 determines both a primary antenna 50A and a secondary antenna 50B (seen in FIG. 4A) are available, then the method 200 proceeds to block 218. Otherwise, the method 200 returns back to block 202.

Referring to FIG. 6C, in block 218, in response to determining the size of the aggregated data packet 70 is greater than the size of the available headroom 66, the modem manager 26 assigns the primary data packets 82 of the primary service data stream that are part of the aggregated data packet 70 to the primary antenna 50 and the secondary data packets 84 of the secondary service data stream that are part of the aggregated data packet 70 to the secondary antenna 50B, which is shown in FIG. 4B. Alternatively, the modem manager 26 assigns the primary data packets 82 of the aggregated data packet 70 to the primary beam 90 and the secondary data packets 84 of the aggregated data packet 70 to the secondary beam 92. The method 200 may then terminate.

Referring generally to the figures, the disclosed mobile communication system provides various technical effects and benefits. Specifically, the modem manager employs active bandwidth management to support two or more service data streams, without the need to introduce additional elements or cost. The disclosed mobile communication system also improves the overall bandwidth utilization efficiency since the wireless connection to the one or more satellite resources is used to transmit the secondary service data stream if available headroom exists. It is to be appreciated that some conventional broadband satellite communication systems are customized to host a single specific modem card, which is extremely limiting. In contrast, the disclosed mobile communication system includes two or more modems, which in turn support different types of antennas and bandwidths.

Figure 7:
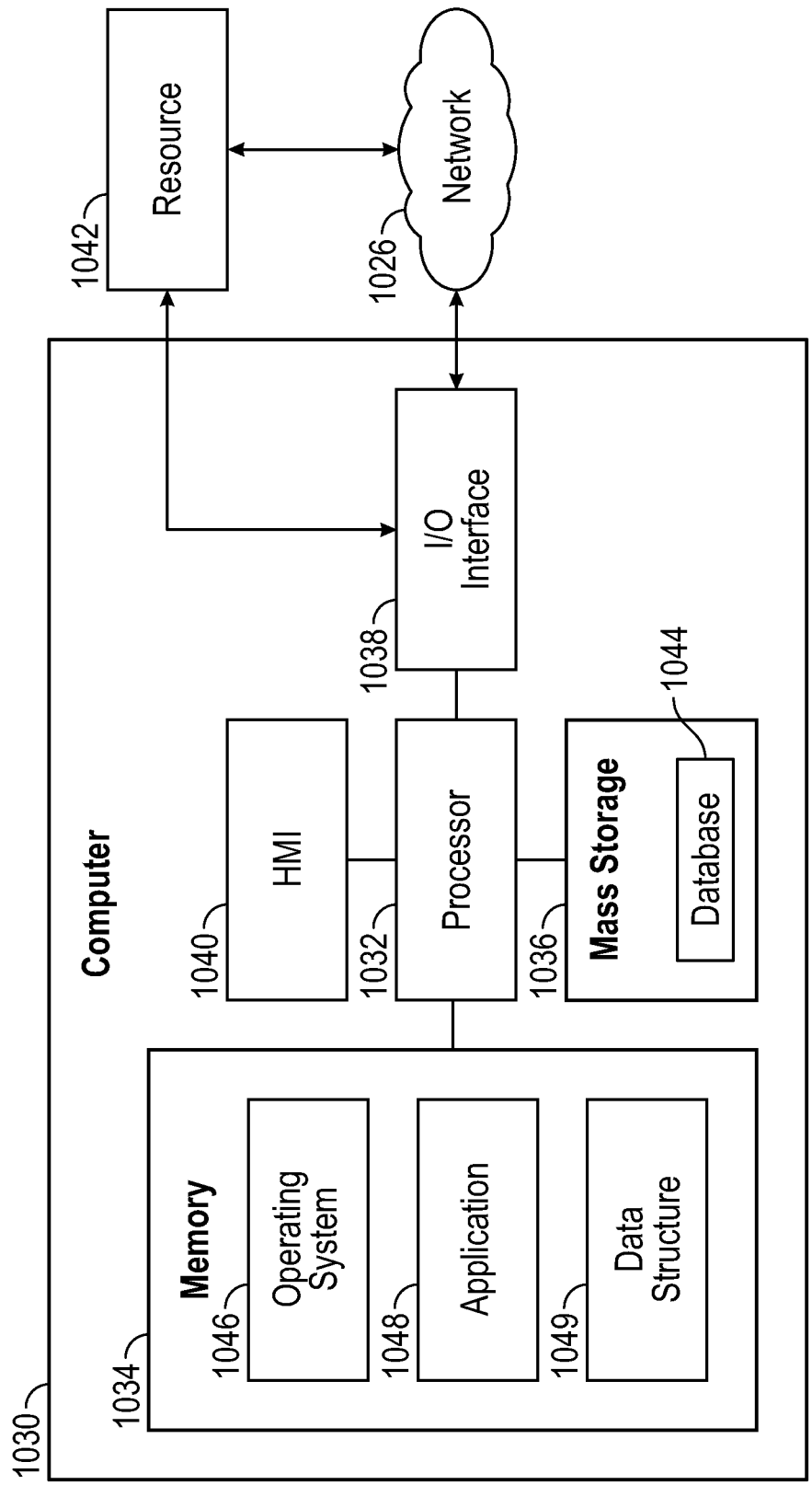
FIG. 7 is a computer system for the disclosed modem manager shown in FIGS. 1 and 2, according to an exemplary embodiment.

Referring now to FIG. 7, the modem manager 26 are implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative example, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising examples of the disclosure. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that examples of the disclosure may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A mobile communication system for sending data to one or more satellite resources over a wireless connection, the mobile communication system comprising:
   one or more processors; and
   a memory coupled to the one or more processors, the memory storing data into a database and program code that, when executed by the one or more processors, causes the mobile communication system to:
      receive a primary service data stream from one or more primary data sources and a secondary service data stream from one or more secondary data sources;
      determine a bandwidth utilization efficiency of the wireless connection between the mobile communication system and the one or more satellite resources;
      determine the wireless connection has available headroom based on the bandwidth utilization efficiency of the one or more satellite resources;
      in response to determining the wireless connection has available headroom, combine the primary service data stream with the secondary service data stream to create an aggregated data packet;
      compare a size of the aggregated data packet with a size of the available headroom of the wireless connection between the mobile communication system and the one or more satellite resources;
      determine the size of the aggregated data packet is less than or equal to the size of the available headroom; and
      in response to determining the size of the aggregated data packet is less than or equal to the size of the available headroom, transmit the aggregated data packet over the wireless connection.

2. The mobile communication system of claim 1, wherein the one or more processors execute instructions to:
   in response to determining the size of the aggregated data packet is greater than the size of the available headroom, continue to receive the primary service data stream and the secondary service data stream.

3. The mobile communication system of claim 1, further comprising two or more modems in electronic communication with the one or more processors.

4. The mobile communication system of claim 1, further comprising one or more antennas in electronic communication with the one or more processors.

5. The mobile communication system of claim 4, wherein the one or more antennas comprise a multi-beam antenna configured to transmit at least a primary beam and a secondary beam.

6. The mobile communication system of claim 5, wherein the one or more processors execute instructions to:
   determine the multi-beam antenna is available in multi-beam mode; and
   in response to determining the multi-beam antenna is available in multi-beam mode and the size of the aggregated data packet is greater than the size of the available headroom of the wireless connection, assign the primary service data stream to the primary beam and the secondary service data stream to the secondary beam.

7. The mobile communication system of claim 4, wherein the one or more antennas comprise a primary antenna and a secondary antenna.

8. The mobile communication system of claim 7, wherein the one or more processors execute instructions to:
   determine the secondary antenna is available; and
   in response to determining the secondary antenna is available and the size of the aggregated data packet is greater than the size of the available headroom of the wireless connection, assign the primary service data stream to the primary antenna and the secondary service data stream to the secondary antenna.

9. The mobile communication system of claim 1, wherein the primary service data stream includes a plurality of primary data packets and the secondary service data stream includes a plurality of secondary data packets, and wherein both the primary data packets and the secondary data packets indicate a bandwidth and a priority.

10. The mobile communication system of claim 9, wherein the one or more processors execute instructions to:
determine the aggregated data packet based on the priority of the primary data packets and the secondary data packets, wherein the primary service data stream takes precedence over the secondary service data stream.

11. The mobile communication system of claim 10, wherein the one or more processors execute instructions to:
determine the bandwidth utilization efficiency of the one or more satellite resources based on the following:

$$\text{bandwidth utilization efficiency} = \frac{B}{P_B + S_B} \times 100$$

wherein B represents a bandwidth of the one or more satellite resources, PB represents a bandwidth of the primary data packets, and Sp represents a bandwidth of the secondary data packets.

12. An aircraft, comprising:
a mobile communication system configured to send data to one or more satellite resources over a wireless connection, wherein the mobile communication system comprises:
one or more antennas;
two or more modems in electronic communication with the one or more antennas;
one or more processors in electronic communication with the two or more modems and the one or more antennas; and
a memory coupled to the one or more processors, the memory storing data into a database and program code that, when executed by the one or more processors, causes the mobile communication system to:
receive a primary service data stream from one or more primary data sources and a secondary service data stream from one or more secondary data sources;
determine a bandwidth utilization efficiency of the wireless connection between the mobile communication system and the one or more satellite resources;
determine the wireless connection has available headroom based on the bandwidth utilization efficiency of the one or more satellite resources;
in response to determining the wireless connection has available headroom, combine the primary service data stream with the secondary service data stream to create an aggregated data packet;
compare a size of the aggregated data packet with a size of the available headroom of the wireless connection between the mobile communication system and the one or more satellite resources;
determine the size of the aggregated data packet is less than or equal to the size of the available headroom; and
in response to determining the size of the aggregated data packet is less than or equal to the size of the available headroom, transmit the aggregated data packet over the wireless connection.

13. The aircraft of claim 12, wherein the one or more processors execute instructions to:
in response to determining the size of the aggregated data packet is greater than the size of the available headroom, continue to receive the primary service data stream and the secondary service data stream.

14. A method of for sending data to one or more satellite resources over a wireless connection by a mobile communication system, the method comprising:
receiving, by a computer, a primary service data stream from one or more primary data sources and a secondary service data stream from one or more secondary data sources;
determining, by the computer, a bandwidth utilization efficiency of a wireless connection between the mobile communication system and the one or more satellite resources;
determining, by the computer, the wireless connection has available headroom based on the bandwidth utilization efficiency of the one or more satellite resources;
in response to determining the wireless connection has available headroom, combining the primary service data stream with the secondary service data stream to create an aggregated data packet;
comparing a size of the aggregated data packet with a size of the available headroom of the wireless connection between the mobile communication system and the one or more satellite resources;
determining the size of the aggregated data packet is less than or equal to the size of the available headroom; and
in response to determining the size of the aggregated data packet is less than or equal to the size of the available headroom, transmitting the aggregated data packet over the wireless connection.

15. The method of claim 14, further comprising:
in response to determining the size of the aggregated data packet is greater than the size of the available headroom, continuing to receive the primary service data stream and the secondary service data stream.

16. The method of claim 14, wherein the mobile communication system further comprises a primary antenna and a secondary antenna in wireless communication with the computer over a wireless communication link.

17. The method of claim 16, wherein the method further comprises:
determining the secondary antenna is available; and
in response to determining the secondary antenna is available and the size of the aggregated data packet is greater than the size of the available headroom of the wireless connection, assigning the primary service data stream to the primary antenna and the secondary service data stream to the secondary antenna.

18. The method of claim 14, wherein the mobile communication system further comprises a multi-beam antenna in wireless communication with the computer over a wireless communication link, wherein the multi-beam antenna is configured to transmit a primary beam and a secondary beam.

19. The method of claim 18, wherein the method further comprises:
determining the multi-beam antenna is available in multi-beam mode; and
in response to determining the multi-beam antenna is available in multi-beam mode and the size of the aggregated data packet is greater than the size of the available headroom of the wireless connection, assigning the primary service data stream to the primary beam and the secondary service data stream to the secondary beam.

20. The method of claim 14, wherein the primary service data stream includes a plurality of primary data packets and the secondary service data stream includes a plurality of secondary data packets, and wherein both the primary data packets and the secondary data packets indicate a bandwidth and a priority.

* * * * *